Figure 1:
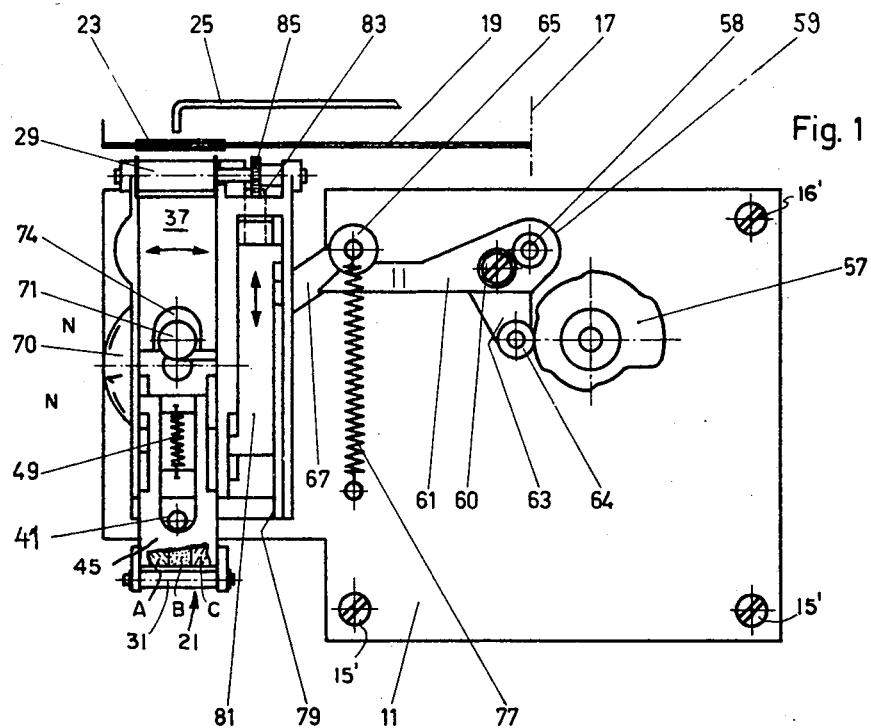

United States Patent [19]

Hepper et al.

[11] 4,141,662
[45] Feb. 27, 1979

[54] RECORDING RIBBON MECHANISM FOR INSTRUMENT RECORDERS

[75] Inventors: Peter Hepper, Au; Willy Steiner, Richterswil, both of Switzerland

[73] Assignee: Elmes Staub & Co., AG, Richterswil, Switzerland

[21] Appl. No.: 767,460

[22] Filed: Feb. 10, 1977

[30] Foreign Application Priority Data

Mar. 9, 1976 [CH] Switzerland .................. 2926/76

[51] Int. Cl.$^2$ ............................................. B41J 33/10
[52] U.S. Cl. ................................ 400/194; 400/213; 400/216.2; 400/236.1
[58] Field of Search ............... 197/157, 158, 156, 168, 197/173, 174, 187

[56] References Cited

U.S. PATENT DOCUMENTS

| 833,227 | 10/1906 | Kunath | 197/156 |
|---|---|---|---|
| 948,974 | 2/1910 | Hess | 197/157 |
| 1,064,703 | 6/1913 | Brown | 197/158 UX |
| 1,457,248 | 5/1923 | Jahn | 197/187 UX |
| 2,163,943 | 6/1939 | Helmond | 197/157 |
| 2,475,336 | 7/1949 | Petz | 197/168 |
| 2,508,780 | 5/1950 | Von Duyke | 197/168 |
| 2,919,008 | 12/1959 | Whippo | 197/157 |
| 3,042,174 | 7/1962 | Howard | 197/168 X |
| 3,283,876 | 11/1966 | Kern | 197/168 |
| 3,871,507 | 3/1975 | Perry et al. | 197/168 X |

FOREIGN PATENT DOCUMENTS

| 911665 | 5/1954 | Fed. Rep. of Germany | 197/168 |
|---|---|---|---|
| 911666 | 5/1954 | Fed. Rep. of Germany | 197/168 |
| 942639 | 5/1956 | Fed. Rep. of Germany | 197/168 |
| 1623727 | 6/1970 | Fed. Rep. of Germany | 197/168 |
| 358940 | 1/1962 | Switzerland | 197/168 |

*Primary Examiner*—Ernest T. Wright, Jr.
*Attorney, Agent, or Firm*—Flynn & Frishauf

[57] ABSTRACT

To simplify transport of a recording ribbon, such as an inked ribbon, making an impression record on a recording strip of a chart-type instrument recorder, the ribbon is formed as a closed, endless loop which is guided in a path adjacent the printing mechanism to impress a mark recording paper; the ribbon transport operates in one direction only to move the ribbon, in steps, thereby avoiding difficulties with respect to ribbon reversal and attendant constructional complications.

8 Claims, 3 Drawing Figures

RECORDING RIBBON MECHANISM FOR INSTRUMENT RECORDERS

The present invention relates to recording instruments, and more particularly to the recording ribbon mechanism for such instruments which may of the single or multi-channel type; and especially to the guidance and transport device to guide and move the ribbon adjacent a printing or impression position.

Recording-type measuring instruments, particularly strip recorders and the like, and which may be single-channel or multiple-channel devices, usually are so constructed that an impression bar is operated intermittently, for example each twelve seconds, which presses a pointer of the measuring instrument against an inked recording ribbon to record, on the paper strip, the then instantaneously existing measured value. This instantaneously existing measured value will then be visible on the paper as a dot or small line. The dots or points or small lines placed adjacent each other then form a continuous curve as the paper is moved. Such recorder-type measuring instruments are used, for example, to record the voltage variations throughout a day, or other predetermined period, at certain junctions or distribution points of a power supply network; other uses for strip-type recorders are supervision of the temperature of chemical processes and the like, continuous monitoring and supervision, with a record, of pressure variations, and other operating parameters in various industrial installations.

The inked recording ribbon may have various color tracks, for example black and red. With multi-color ribbons it is possible to record different parameters with the same instrument, for example voltage and current at a certain distribution point of a network. Switching arrangements are combined with multi-channel measuring instruments which, in predetermined switching distances, change over recording from one color, representative of one parameter, to recording in the other color, representative of another parameter. The switch-over may occur in uniform intervals, for example three seconds apart. The ribbon itself is moved in a direction transverse to the major plane of the ribbon, similarly to the movement of a multi-color typewriter ribbon, by a movable vibrator a multicolor typewriter, so that the color record will be as desired in the one, or other color, as determined by the particular portion of the ribbon which is engaged.

One dot chart recorder uses a plurality of inked ribbons which are securely stretched between two ribbon carriers. The indicator of the measuring instrument can move over the entire width of the recording paper. Different records thus use different points of the inked ribbon. To record a single dot does not require much ink or other pigmental material. The ribbon, thus, is not used much. This arrangement is suitable if there is a wide variation in measured data; if, however, the measured value hardly changes during an extended period of time or, for example, late at night, does not change at all for an appreciable period, practically the same point of the ribbon is engaged with the paper at each time so that the specific engagement point will exhaust its ink supply. For that particular measured value, therefore, a sequential indication will be lacking, or the recording will be defective and poorly legible.

It has previously been proposed to provide an inked ribbon transport mechanism for such measuring instruments in which the ink ribbon is guided from one spool to another, similarly to a typewriter ribbon mechanism. This construction is comparatively complicated since the direction of winding of the ribbon must be reversed when the ribbon is completely wound on one spool, and then must be re-wound to the other spool. These mechanisms are space-consuming and cause trouble and are subject to malfunction, particularly since a positive operating force, as given, for example, by operation of a key of a typewriter, is usually lacking. Recording, however, is excellent even if the measured value to be recorded remains the same for an appreciable period of time.

It is an object of the present invention to provide a mechanism for an ink recording ribbon, suitable for recording in a single, or multi-channel recorder-type instrument in which the disadvantages with a typewriter-like ink ribbon transport mechanism are avoided while, however, still providing the advantage of excellent recording by a movable ribbon. The mechanism should be simple and trouble-free while still permitting clean and sharp printing impressions under all operating conditions, even if the measured values to be recorded remain the same for an appreciable period of time.

SUBJECT MATTER OF THE PRESENT INVENTION

Briefly, the ink recording ribbon is formed as an endless closed loop and guidance and transport arrangements are provided, coupled to the loop of ink recording ribbon which move the ribbon, but only in one direction by a predetermined feed step distance.

Forming the ribbon as an endless loop permits placement of the ribbon with particularly low space requirements since no spools for the ink ribbon are needed. The ribbon can easily be guided around the frame of the recording instrument, where it is readily accessible. This facilitates insertion and replacement of the ribbon. The closed loop form of the ribbon then permits moving it in one direction only since reversal of the direction is not needed in order to continuously move the ribbon. The entire mechanism is simplified, which is particularly desirable because the operating reliability is thereby improved. Yet, although the ink recording ribbon mechanism approaches that of fixed ribbons regarding simplicity, the disadvantages of a fixed ribbon — depletion of ink at specific locations where repetitively printed — do not occur. The ribbon is moved and, therefore, in actual use, the entire ribbon is essentially uniformly used up, while providing clean and sharp recording of data.

The guidance and feed means for the ribbon preferably are located at a spaced position with respect to each other to surely and reliably guide the ribbon. Some of the guide elements, preferably rollers, are desirably movably mounted and spring-loaded to tension the ribbon, and permit relative movement of the guide elements with respect to each other. The loop of the ribbon, therefore, may have a certain tolerance in length, without interfering with operation of the entire recording system. Stretching the ribbon, that is, providing a resilient spring bias thereto, ensures that the ribbon can be held spaced from the recording paper under ordinary circumstances and is pressed against the paper only when an imprint is desired. Some tension on the ribbon is also desirable to permit frictional transport thereof. At least one of the guide elements, and preferably all, should be made as a rotatable roller. One of these rollers then is driven and serves as a frictional drive. A certain engagement pressure is needed in order to effect feed of the ribbon. In a preferred form, all the guide elements are rollers so that the overall drive friction is decreased.

In accordance with a preferred embodiment of the invention, two guide elements, preferably rollers, are located spaced from each other and commonly movable transversely to the direction of feed of the ribbon. This arrangement permits movement of various tracks of the ribbon in printing position, for example to permit printing with various colors on multi-color ribbons, to thereby generate multi-color recording curves representing different parameters. The arrangement is also suitable for use with a single channel measuring instrument since the entire width of the ribbon can thus be used more efficiently.

DRAWING

Figure 2:
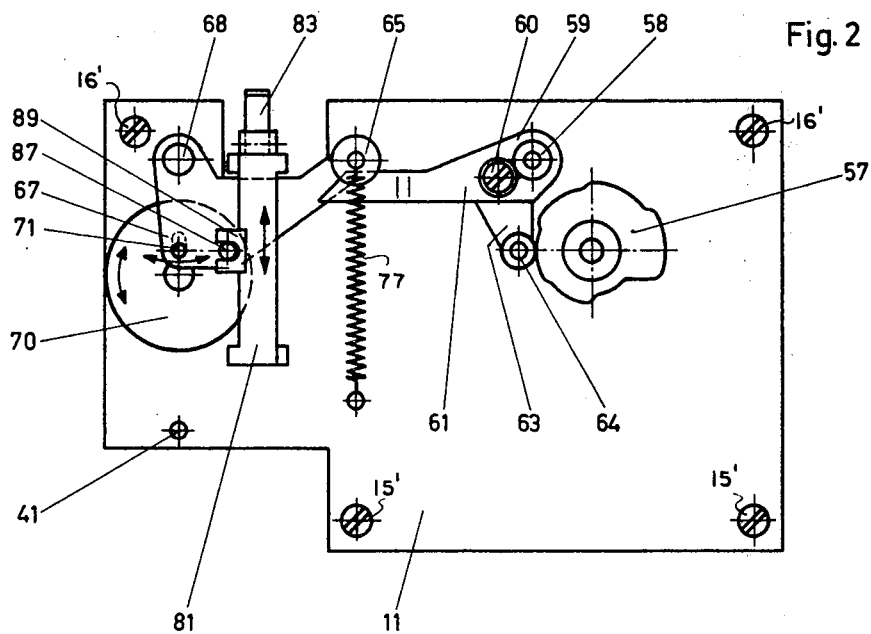
Figure 3:
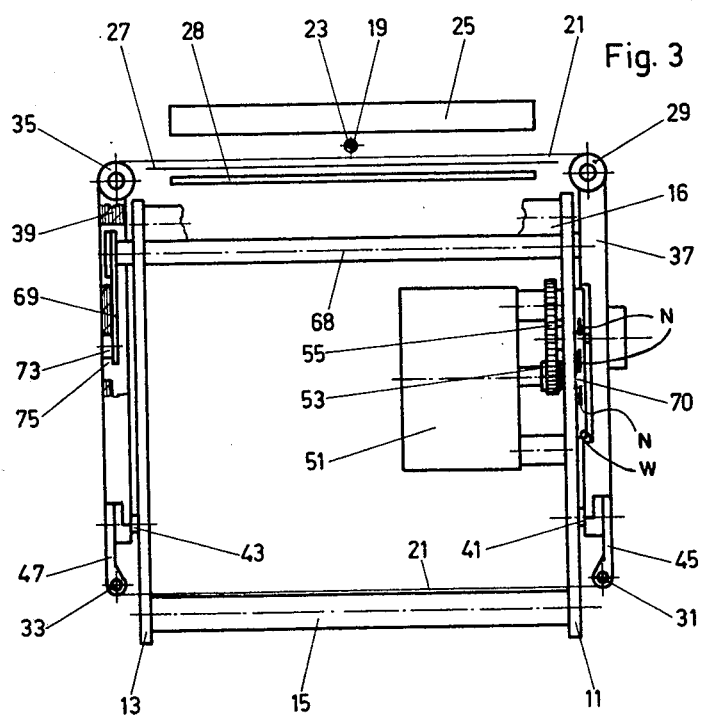

Illustrating an example:

FIG. 1 is a highly schematic side view of a multi-channel recording instrument in which elements not necessary for an understanding of the invention have been omitted and in which the ribbon mechanism is shown in detail;

FIG. 2 is a view similar to FIG. 1 in which, however, the guide element holders have been removed although the ratchet mechanism is shown which is, in actuality, secured to the guide holder, in order to illustrate operation of the transport mechanism; and FIG. 3 is a top view of the instrument of FIG. 1 showing the path of the ribbon and in which the pointer of the instrument and the printing bar are shown only schematically.

The measuring instrument, as seen in FIG. 3, is retained between a pair of end plates 11, 13, maintained in relatively spaced position by spacer rods 15, 16 held in position by screws 15', 16' (FIGS. 1, 2). The measuring instrument as well as the printing apparatus and the paper feed apparatus are, essentially, located between the plates 11, 13. The measuring instrument itself — of whatever type — and the printing apparatus and the paper feed apparatus do not form part of the present invention and, therefore, have been omitted from the figures to the extent they are not needed in connection with the illustration of the inventive concept. The figures, therefore, essentially show only the recording ink ribbon mechanism.

The axis 17 (FIG. 1) of an indicator of the measuring instrument (not shown) forms a pivot for pointer 19 (FIGS. 1, 3) which is formed with a printing edge or printing projection 23 in the range of the ribbon 21 (FIG. 3). Ribbon 21 as shown in FIG. 1 is guided around guide roller 29. A printing bar or printing bail 25, shown schematically, is located above the pointer 19 in the region of the printing or impression zone projection 23. The printing bail 25 is operated by an operating mechanism, well known and not shown in the figures, after predetermined time intervals, for example every twelve seconds. It is moved downwardly (FIGS. 1, 3) against the pointer 19 to move the pointer 19 towards the ribbon 21, so that the printing projection 23 presses the inked ribbon 21 against recording paper 27. The recording paper 27 is backed up by a back-up platen 28. A point is thus recorded on the recording paper 27 at the contact or engagement region between the paper 27 and the projection 23 which represents the value measured by the instrument at the instant of time when the printing pressure is applied against pointer 19. Recording paper 27 is fed by a paper transport mechanism (not shown) towards the left in FIG. 1. The recorded values, then, will be visible as the paper 27 passes the front edge of the instrument.

The description, so far, is that of any customary or commercial recording-type measuring instrument, or strip recorder. The present invention is concerned with the ribbon 21 and the transport mechanism therefor.

In accordance with the present invention, and as seen in FIG. 3, ribbon 21 is in the form of an endless, closed loop. The looped ribbon 21 is guided by guide elements 29, 31, 33, 35 which, as shown, are rollers to reduce friction. The guide elements 29, 35 are secured in a guide holder 37, 39, respectively, located in spaced position from each other and pivoted on pins 41, 43 (FIGS. 1, 3). Rollers 31, 33 are seated on sliders 45, 47 which are longitudinally slidable in respective holder 37, 39. A spring 49, only one shown in FIG. 1, is located between the slider 45, 47 and the holder 37, 39 and so arranged that it has the tendency to move the slider 45, 47 in such a direction that the distance between the rollers 29, 31 and 35, 33 tends to increase. Thus, ribbon 21 (FIG. 3) is tensioned. With reference to FIG. 3, the rollers 33, 31 are biassed downwardly. The ribbon 21 itself has been omitted from the illustration in FIG. 2 and is shown only in fragmentary form in FIG. 1 for better visibility of the remaining components, or parts.

The ribbon 21 may be a multi-color ribbon (FIG. 1) with two or more color tracks, three of which are shown in FIG. 1 at A, B, and C. The ribbon 21 can be pivoted to permit recording measured values derived, for example, from different measuring channels with different color imprints. The guide holders 37, 39 are pivoted by motor 51 (FIG. 3). Motor 51 is connected through a gearing 53, 55 with a cam disk 57 (FIG. 1). An angled lever 59 is pivoted on a pin 58 (FIGS. 1, 2). The angled lever 59 has two arms 61, 63, the relative positions of which can be changed by relative adjustment and subsequent clamping by screw 60. A roller 64, forming a cam follower roller, is attached to arm 63. Roller 64 runs off cam disk 57. Arm 61 of lever 59 acts on roller 65 (FIGS. 1 and 2) of a first pivot lever 67 which is secured to a second pivot lever 69 by a shaft 68 extending transversely across the instrument, as seen in FIG. 3. The two levers 67, 69 each are supplied with a follower pin 71, 73 which engages a slit 74, 75, respectively, formed on the ribbon guide holders 37, 39. A return spring 77 (FIGS. 1, 2) engages lever 67 which is in engagement with the arm 61 of lever 59 and ensures that roller 64 follows the contour of the cam disk 57.

The follower pin 71 engages not only the guide holder 37 but, additionally, an indicating disk 70. Disk 70 has a sequence of numerals or code indicia N, e.g. color marks placed thereon which sequentially are visible through a window W in the frame 11, 13, 15, 16 to indicate the respective recording channel for which recording is then being effected. For example, and as seen in FIG. 3, numeral 1 is visible at the edge; in FIG. 1 at the side.

One of the guide holders 37 is formed with a guide track 79 in which a ratchet slider 81 can slide. Ratchet slider 81 carries a movable pawl 83 which is spring pressed against ratchet wheel 85. The ratchet wheel 85 is secured to the roller 29 so that rotary movement of the ratchet wheel 85 causes feed movement of the roller 29 in one direction only, and thereby moves the ribbon 21 in one direction.

The first lever 67, FIG. 2, is formed with a pin 87 which fits in a guide 89 of the ratchet slider 81. Reciprocating movement of the lever 67 about the axis of shaft 68 thus moves the ratchet slider 81 up and down (with respect to FIGS. 1 and 2) so that, by engagement of pawl 83 with ratchet wheel 85, ribbon 21 is fed forwardly at each upward motion of the slider 81. Forward feed motion of the ribbon 21 is thus readily effected without the use of complicated parts, or without requiring a large number of parts, and is coupled to tipping or tilting movement of the guide holders 37, 39 and feed movement is obtained thereby.

The invention is not limited to the example shown. Various changes and modifications may be made within the scope of the inventive concept and without departing therefrom. For example, if only a single-channel recording is to be effected, so that a ribbon 21 could be fed without tilting movement thereof — the tilt mechanism formed by guide holders 37, 39 permits use of the entire width, even if the width is of a single color. Even if the recorder is a single-channel recorder, the life and efficient use of the inked ribbon 21 can be substantially extended by using not only the entire longitudinal extent thereof, as effected by feeding the ribbon 21 in circumferential direction upon movement of the ratchet wheel 85, but by additionally moving the ribbon 21 transversely by pivoting of the guide holders 37, 39 to provide different engagement points of the engagement projection 23 of pointer 19 with the ribbon 21, with respect to its width.

The use of a motor-driven cam disk 57 is a particularly simple and advantageous embodiment since it permits conversion of continuous movement into intermittent movement, controlling the lever 59 which, in turn, controls the second lever 67 which is connected to the feed mechanism. The feed mechanism, coupled to pawl 83, then directly engages the respective feed ratchet 85. The guide elements 29, 35 are synchronously and conjointly moved by tipping, under control of the single cam disk 57. Coupling the tipping or tilting movement of the ribbon 21 transverse to its length with feed movement thereof permits a particularly simple construction by using essentially the same mechanism to, on the one hand, change the impact position of the printing projection 23 with respect to the width of the ribbon 21, as well as the longitudinal feed thereof.

Force derived from engagement of the cam follower roller 64 (FIGS. 1, 2) with the cam disk 57 is indirectly transferred to lever 67. To adjust the force transfer, screw 60 can be loosened and the position of the second arm 63 of lever 59 adjusted. Adjustment of arm 63 controls the extent of deflection both of the ribbon 21 in transverse direction, as well as the extent of feed in longitudinal direction. The extent of feed in longitudinal direction could, independently, be adjusted also by replacement of ratchet wheel 85 by a similar ratchet wheel of different diameter.

Forming the ink ribbon 21 as an endless loop has the additional advantage that the entire structure can be arranged such that the ribbon 21 operates, practically, in a vertical plane if the recorder is laid flat, that is, with its bottom side down, as illustrated, for example, in FIGS. 1 and 3. This is a particularly desirable arrangement for constructing the printing mechanism, and permits easy replacement of the loop forming the ink ribbon 21.

The indicating disk 70, which indicates which particular color channel or which particular transverse location of the ribbon 21 is being used for printing, is desirable; this disk 70 is directly coupled to lever 67 and permits immediate indication which one of the channels, that is, which one of the color tracks A, B, C on the ribbon 21 are being used for recording at any instant of time. Even if the ribbon 21 is a single-color ribbon, rotation of disk 70 will indicate proper function of the system and use of the ribbon 21 throughout its entire width, as well as length. The directions of movement of the respective disks, levers, and elements are indicated by the double arrows in FIGS. 1 and 2.

We claim:

1. In an instrument recorder, a recording ribbon mechanism to move an endless loop recording ribbon (21) to make a record on recording paper means, upon rotation of the cam disk by the drive motor, being subjected to rocking motion;
   a shaft (68) extending transversely of the frame and coupled to the first lever means;
   a second lever means (69) located closely adjacent to the other side wall of the frame and coupled to the shaft (68) to move conjointly therewith;
   coupling elements (71, 73; 74, 75) coupling the respective first and second lever means (67, 69) with a respective guide element holder means (37, 39) at a respective side of the frame to rock said guide element holder means and hence said guide elements (29, 35) at respectively opposite lateral sides of the frame conjointly upon movement of said cam disk (57);
   a rachet slider (81) coupled to one of said lever means (67) to reciprocate upon rocking movement of the lever means;
   and a ratchet pawl (83) — ratchet wheel (85) arrangement coupling the ratchet slider (81) to said roller (29) to thereby effect rotation of said roller (29) in one direction only upon reciprocating movement of the ratchet slider and effect longitudinal feed of the ribbon at the same time that said ribbon is moved by said guide means (29, 35) transversely to its length.

2. Mechanism according to claim 1, wherein the distance between at least two of said guide means (27) of results measured by the instrument, in which the instrument has at least one recording channel, comprising
   an essentially rectangular frame having spaced side walls (11, 13);
   a recording paper support (28);
   a printing mechanism (19, 23, 25) to impress a mark from the recording ribbon (21) on the recording paper (27) located on the recording paper support (28);
   guide means (29, 31, 33, 35) located at respective corners of the rectangular frame mounted on the frame guiding the endless loop recording ribbon (21) in a closed loop and having a portion adjacent the recording paper support (28), said guide means including at least one roller (29) in frictional, driving engagement with the ribbon (21),
   and power means simultaneously feeding the recording ribbon (21) longitudinally, while moving a portion of the recording ribbon transversely, including
   a drive motor (51) secured to the frame;
   elongated guide element holder means (37, 39) pivotally secured to respective side walls and respectively supporting said guide means (29, 35) including said at least one roller (29) and being conjointly movable in a direction essentially perpendicularly to the direction of movement of the ribbon loop, to move the ribbon (21) transversely to its length;

a cam disk (57) closely adjacent one side wall of said frame and driven by the drive motor;

first lever means (59, 61, 63, 67) pivotally mounted on said one side wall and a cam follower means (64) on said first lever means coupled to said cam disk and located closely adjacent to said one side wall of said frame, the first lever (29, 31; 33, 35) is variable;

and spring means are provided acting between respectively variably spaced guid means and biasing the variably spaced guide means with respect to each other to tend to increase the distance and to tension the endless loop recording ribbon which is looped above the guide means.

3. Mechanism according to claim 1 wherein the first lever means includes an adjustable angle lever (59).

4. Mechanism according to claim 1, wherein the endless loop recording ribbon is located in an essentially vertical plane.

5. Mechanism according to claim 1, further comprising an indicator disk (70) coupled to at least one of said guide element holder means to indicate relative rocked position thereof, said indicator disk (70) being formed with indicating indicia (N) to thereby indicate at which transverse position, with respect to the width of the ribbon, the printing mechanism engages the ribbon, as determined by the respective pivot position of the guide element holder means (37, 39).

6. In an instrument recorder, a recording ribbon mechanism to move an endless recording ribbon loop (21) to make a record on recording paper (27) of results measured by the instrument, in which the instrument has at least one recording channel comprising an essentially rectangular frame (11, 13, 15, 16) having two spaced, essentially parallel side members (11, 13);

a printing mechanism (19, 23, 25) to impress a mark from the recording ribbon loop on the recording paper;

a ribbon transport means (29; 81, 83, 85) comprising a first roller (29) in frictional engagement with the endless recording ribbon loop (21) located at a corner of the frame;

motor drive means (51) and a cam disk (57) coupled to said motor drive means to rotate therewith, the cam disk being positioned closely adjacent to one side member (11) of the frame;

cam follower means (59, 61, 63, 64) in engagement with said cam disk (57) located adjacent said one side member (11) of the frame;

ratchet drive means (65, 67, 81, 83, 85) in engagement with said cam follower means intermittently, unidirectionally driving said first roller (29) to thereby move said ribbon loop, in stepped increments along its length;

and means moving a portion of the ribbon loop transversely of its width simultaneously upon movement of the ribbon loop longitudinally with respect thereof including a second roller (35) in engagement with said ribbon loop (21);

two elongated movable support means (37, 39) for said first and second rollers, one at either side (11, 13) of and closely adjacent to the side members of said frame;

two pivot means (41, 43), one on each side member of said frame and having pivot axes transverse to the axis of the respective rollers (29, 35), secured on said frame and, respectively supporting the support means for said first roller (29) and the second roller (35), said second roller being located transversely opposite said first roller across the recording paper; and means (68) coupling said two support means for conjoint pivotal movement about their pivot means;

at least one of said movable support means (37) being coupled to said cam follower means (59, 51, 63, 64) and being movable therewith to conjointly rock the two support means and hence said first roller (29) and said second roller (35) in a direction transversely to the intermittent movement direction of said ratchet drive means to stagger sequential impressions of the printing mechanism along the endless recording ribbon loop both along its length as well as across its width as the ribbon loop is moved by said motor drive means, whereby the motor drive means forms a single drive for the ribbon loop in two directions.

7. Mechanism according to claim 6 further comprising an indicator disk (70) coupled to at least one of the movable support means (37) to indicate the relatively rocked position of said movable support means (37, 39), said indicator disk (70) being formed with indicating indicia (N) to indicate at which transverse position, with respect to the width of the ribbon loop, the printing mechanism engages the ribbon loop (21) as determined by the respective rocked pivot position of said movable support means (37, 39).

8. Mechanism according to claim 6 wherein said cam follower means (59, 61, 63, 64) includes an adjustable angle lever having two angle portions (61, 63) relatively adjustable with respect to each other, one of said portions (63) being in cam following engagement with said cam disk (57) driven by the motor drive means (51), the other portion being in engagement with both said intermittent ratchet drive means for said first roller (29) and said movable support means (37, 39) supporting said rollers and rocking said two support means and hence the rollers in a direction transversely to the longitudinal direction of the ribbon loop (21).

* * * * *

UNITED STATES PATENT AND TRADEMARK OFFICE
CERTIFICATE OF CORRECTION

PATENT NO. : 4,141,662
DATED : February 27, 1979
INVENTOR(S) : Peter HEPPER et al It is certified that error appears in the above—identified patent and that said Letters Patent are hereby corrected as shown below:

Change claims 1 and 2 to read in accordance with the attached.

Signed and Sealed this

Second Day of October 1979

[SEAL]

Attest:

RUTH C. MASON
Attesting Officer

LUTRELLE F. PARKER
Acting Commissioner of Patents and Trademarks

1. In an instrument recorder, a recording ribbon mechanism to move an endless loop recording ribbon (21) to make a record on recording paper (27) of results measured by the instrument, in which the instrument has at least one recording channel, comprising
   an essentially rectangular frame having spaced side walls (11, 13);
   a recording paper support (28);
   a printing mechanism (19, 23, 25) to impress a mark from the recording ribbon (21) on the recording paper (27) located on the recording paper support (28);
   guide means (29, 31, 33, 35) located at respective corners of the rectangular frame mounted on the frame guiding the endless loop recording ribbon (21) in a closed loop and having a portion adjacent the recording paper support (28), said guide means including at least one roller (29) in frictional, driving engagement with the ribbon (21),
   and power means simultaneously feeding the recording ribbon (21) longitudinally, while moving a portion of the recording ribbon transversely, including
   a drive motor (51) secured to the frame;
   elongated guide element holder means (37, 39) pivotally secured to respective side walls and respectively supporting said guide means (29, 35) including said at least one roller (29) and being conjointly movable in a direction essentially perpendicularly to the direction of movement of the ribbon loop, to move the ribbon (21) transversely to its length;
   a cam disk (57) closely adjacent one side wall of said frame and driven by the drive motor;
   first lever means (59, 61, 63, 67) pivotally mounted on said one side wall and a cam follower means (64) on said first lever means coupled to said cam disk and located closely adjacent to said one side wall of said frame, the first lever means, upon rotation of the cam disk by the drive motor, being subjected to rocking motion;
   a shaft (68) extending transversely of the frame and coupled to the first lever means;
   a second lever means (69) located closely adjacent to the other side wall of the frame and coupled to the shaft (68) to move conjointly therewith;
   coupling elements (71, 73; 74, 75) coupling the respective first and second lever means (67, 69) with a respective guide element holder means (37, 39) at a respective side of the frame to rock said guide element holder means and hence said guide elements (29, 35) at respectively opposite lateral sides of the frame conjointly upon movement of said cam disk (57);
   a rachet slider (81) coupled to one of said lever means (67) to reciprocate upon rocking movement of the lever means;
   and a ratchet pawl (83) — ratchet wheel (85) arrangement coupling the ratchet slider (81) to said roller (29) to thereby effect rotation of said roller (29) in one direction only upon reciprocating movement of the ratchet slider and effect longitudinal feed of the ribbon at the same time that said ribbon is moved by said guide means (29, 35) transversely to its length.

2. Mechanism according to claim 1, wherein the distance between at least two of said guide means (29, 31; 33, 35) is variable;
and spring means are provided acting between respectively variably spaced guid means and biasing the variably spaced guide means with respect to each other to tend to increase the distance and to tension the endless loop recording ribbon which is looped above the guide means.